United States Patent [19]

Allori et al.

[11] 4,354,931

[45] Oct. 19, 1982

[54] CHECK VALVE ASSEMBLY WITH ACTUATOR

[75] Inventors: Aldo Allori, Brookfield; John A. Wilger, Chicago; Thomas F. Reiff, Bridgeview, all of Ill.

[73] Assignee: International Harvester Co., Chicago, Ill.

[21] Appl. No.: 253,960

[22] Filed: Apr. 13, 1981

[51] Int. Cl.³ .............................................. B01P 35/02
[52] U.S. Cl. .................................... 210/136; 210/167; 137/535
[58] Field of Search ............... 210/117, 136, 234, 235, 210/167, 168; 137/511, 522, 523, 530, 531, 535

[56] References Cited

U.S. PATENT DOCUMENTS

| 922,657 | 5/1909 | Worsey . | |
|---|---|---|---|
| 1,220,231 | 3/1917 | Jack | 210/234 |
| 1,720,380 | 7/1929 | Schulze . | |
| 1,782,702 | 11/1930 | Wheeler . | |
| 2,214,459 | 9/1940 | Gottlieb | 137/535 |
| 2,264,136 | 11/1941 | Karlberg | 137/535 |
| 2,331,119 | 10/1943 | Gouldbourn et al. | 210/235 X |
| 2,344,486 | 3/1944 | Arvins et al. | 210/136 X |
| 3,273,715 | 9/1966 | Rosaen | 210/90 |
| 3,363,762 | 1/1968 | Ensign | 210/136 |
| 3,507,391 | 4/1970 | Rosaen | 210/234 X |

FOREIGN PATENT DOCUMENTS 541488  11/1941  United Kingdom ............... 210/234

Primary Examiner—John Adee
Attorney, Agent, or Firm—Boris Parad; F. D. Au Buchon

[57] ABSTRACT

A check valve assembly regulating the fluid flow between the fluid reservoir and filter cartridge chamber is actuated by a valve actuating member movable through and controllable exteriorly of a filter system housing without compromising the housing leak integrity. The actuating member may perform another function of a drain plug for the filter chamber, so that upon removal of the member the check valve assembly will be closed and the chamber fluid drained through a drain plug opening without loss of the reservoir fluid.

14 Claims, 3 Drawing Figures

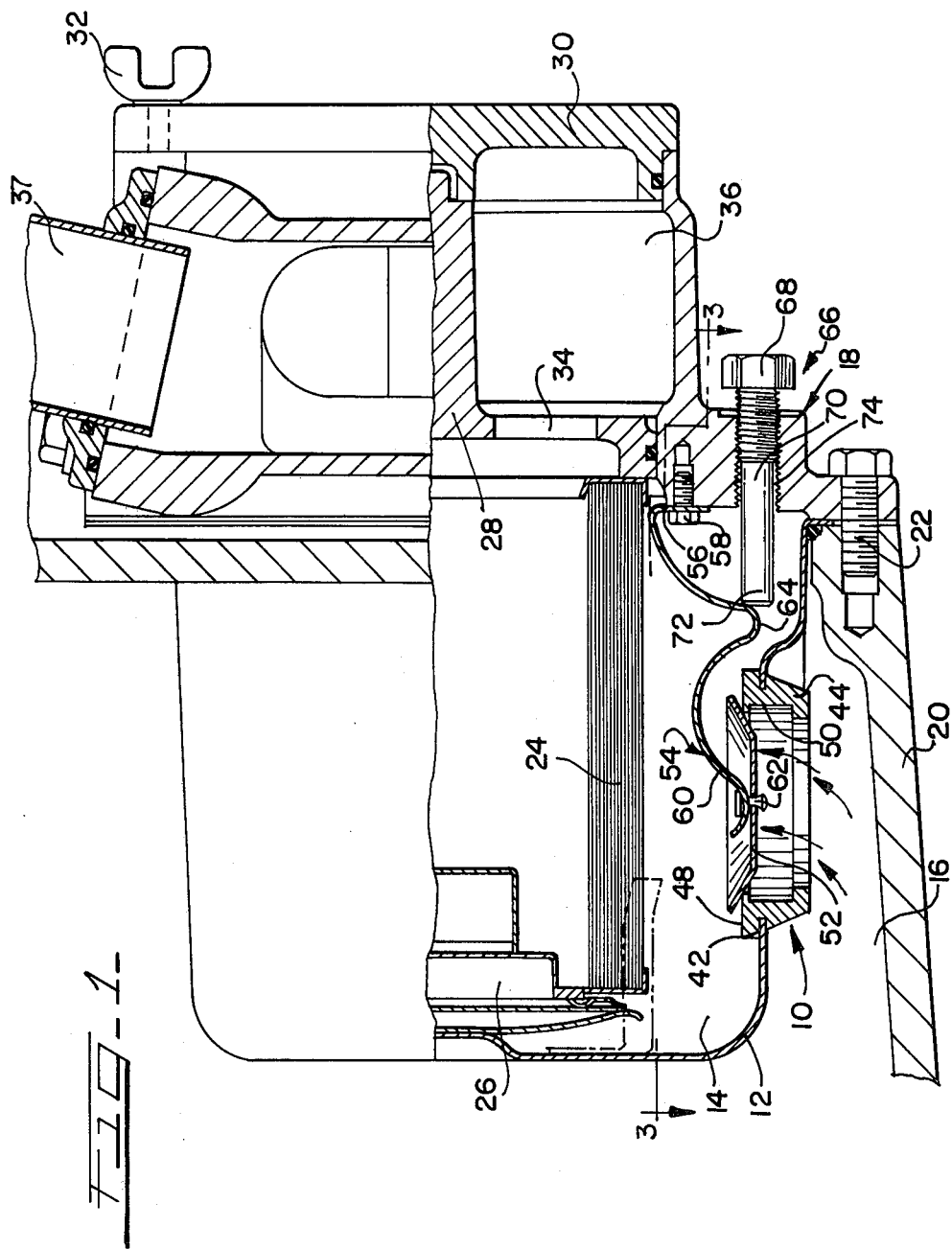

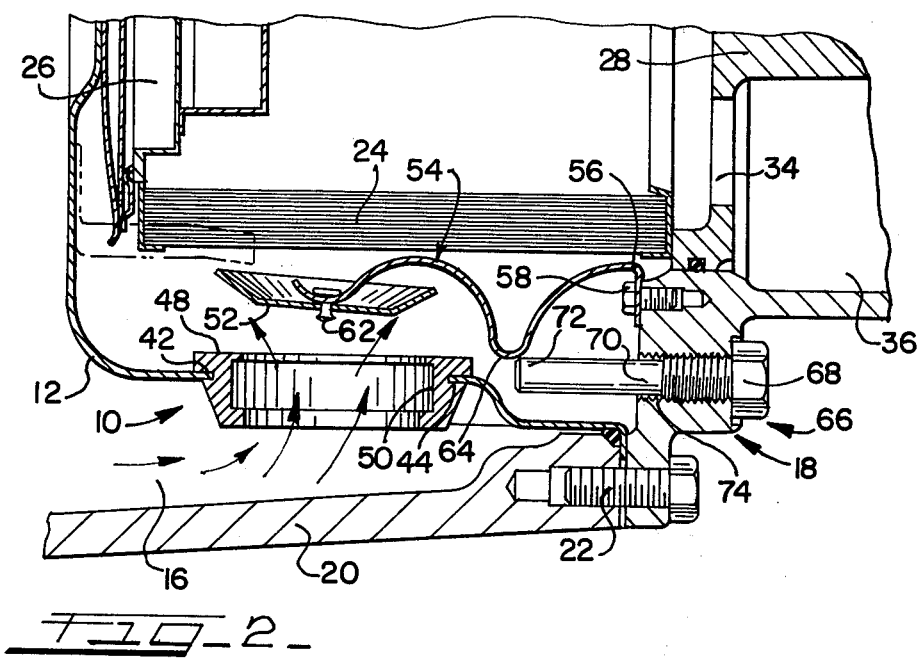
FIG_2
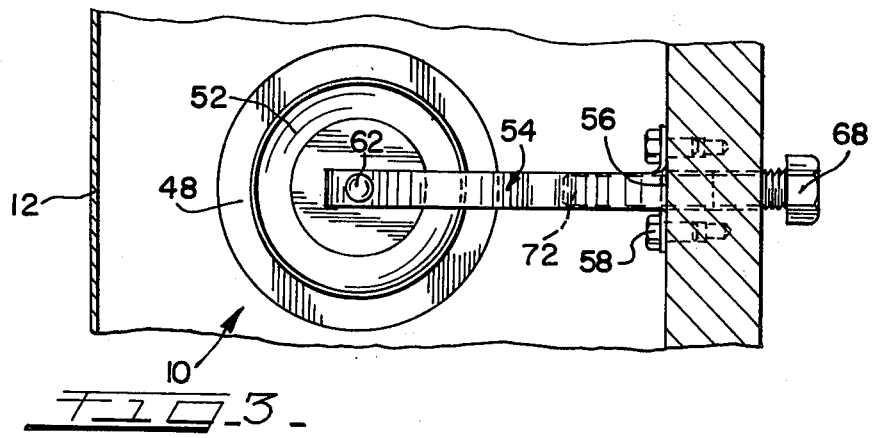
FIG_3

CHECK VALVE ASSEMBLY WITH ACTUATOR

BACKGROUND OF THE INVENTION

1. Field of the Invention

This invention relates to hydraulically actuated systems with changeable fluid filters and particularly to a check valve assembly preventing the loss of the fluid during the service of fluid filters.

2. Description of the Prior Art

The prior art is replete with different hydraulic systems utilizing various designs of check valve assemblies. For example, the U.S. Pat. No. 3,273,715, issued to N. O. Rosaen, discloses fluid filters of the type embodying an axially movable or slidable filter cartridge having indicating means associated therewith. The U.S. Pat. No. 1,782,702, issued to L. H. Wheeler, discloses a liquid handling device having filtering means including a detachable cup and a check valve in a cube unseated by attaching said cup. The U.S. Pat. No. 3,363,762, issued to H. W. Ensign, discloses a removable element filter assembly having flow preventing means in which a pair of automatically operated check valves contained in the strainer body control fluid flow. The U.S. Pat. No. 2,331,119, issued to J. Gouldbourn, et al., specifies a lubricating system having a shut off valve which is rendered operative by the removal of the filter. The U.S. Pat. No. 1,220,231, issued to R. K. Jack, specifies a strainer device having a self-closing valve which automatically shuts off access to the strainer chamber of the oil or other substance. The U.S. Pat. No. 922,657, issued to C. H. Worsey, discloses a strainer for lubricating systems which provides means for insuring continuous flow thereof to the bearings.

However, none of the prior art references of record discloses the novel check valve assembly having an actuator as disclosed in the subject invention.

SUMMARY OF THE INVENTION

It is an object of the present invention to provide novel means in a filter system for effectively closing the fluid flow from a reservoir to a filter cartridge chamber so that the filter cartridge can be quickly and efficiently changed without loss of the fluid from the reservoir.

Another object of the invention is to provide a check valve assembly effectively regulating the flow of fluid from the main fluid reservoir to the filter cartridge chamber and being actuated by spring tension adjusting means without draining the fluid from the filter cartridge chamber.

A further object of the invention is to provide a drain check valve assembly for shutting off the incoming fluid from flowing to the filter cartridge chamber on removal of the cartridge by utilizing a drain plug element, thereby eliminating the necessity of shutting down the hydraulic system, and permitting the cartridge to be changed while the system is maintained in continuous operation.

In accordance with these objects a check valve assembly is mounted on an enclosure wall separating a filter cartridge chamber and a main hydraulic fluid reservoir. The chamber and reservoir are encapsuled by a filter system housing. The check valve assembly includes a spring element attached to an interior side of the housing and to a movable valve element which closes and opens the fluid flow through the check valve. An actuating member mounted on and controllable exteriorly of the housing is engageable with the spring element within the chamber. Displacement of the actuating member through the housing regulates the spring element tension thereby affecting the movable valve element position, to-wit, closing or opening of a fluid inlet opening in the check valve assembly by the valve element. Thus, the fluid flow from the reservoir to the filter cartridge chamber through the check valve assembly can be shut off for subsequent draining of the chamber and servicing of a filter cartridge without inhibiting the hydraulic fluid system operation.

Also, the same check valve assembly may be utilized for shutting off the fluid flow between the reservoir and the filter cartridge chamber and simultaneously draining of fluid from the filter cartridge chamber. In this case, the removal of the actuating member, also functioning as a drain plug, would cause the check valve assembly to close the fluid flow to the filter cartridge chamber and also will allow the chamber fluid to be drained through the opening which was plugged by the actuating member.

These and other objects of the invention will become apparent to those having ordinary skills in the art by reference to the following description, drawings and appended claims.

BRIEF DESCRIPTION OF THE DRAWINGS

FIG. 1 is an enlarged cross-sectional view of a check valve assembly in closed position.

FIG. 2 is a cross-sectional view of the check valve assembly in open position.

FIG. 3 is a top view of the check valve assembly taken substantially along the line 3-3 of FIG. 1.

DESCRIPTION OF THE PREFERRED EMBODIMENT

Referring now to the drawings wherein reference characters designate like or corresponding parts throughout the several views, there is shown in FIG. 1 a check valve assembly 10, which is disposed on the enclosure wall 12 encompassing a filter cartridge chamber 14 and separating it from a main hydraulic reservoir 16. A housing 18 is connected to the fluid reservoir wall 20 by a screw 22. A filter cartridge 24 is mounted between a bypass valve 26 and a filter cartridge plug 28. A filter plug cover 30 is removably attached to the filter plug 28 by screws 32. The filter plug 28 has circulation openings 34 facilitating the fluid flow movement from the filter cartridge chamber 14 to the mainstream of a hydraulic system via passages 36, 37 in the housing 18.

An enclosure wall opening 40 is defined by the edge portion 42 of the enclosure wall 12. A collar 44 is mounted on the edges 42 by means of an O-ring recess 46 adapted to fit snugly with the edge portion 42. The collar or seat 44 has a frusto-conical shape with its base portion 48 facing the interior of the filter cartridge chamber 14. A central bore 50 extending through the collar 44 serves as a conduit or inlet opening for the fluid flow from the main hydraulic wall reservoir 16 to the filter cartridge chamber 14.

A valve disc 52 is disposed within the filter chamber 14 and is adapted to fit snugly with the base portion 48 of the collar 44. The valve disc 52 has a frusto-conical configuration like a dish-shaped plate. A leaf spring 54 is attached to the housing 18 at its one end 56 by screws 58 or any other suitable mechanical means. Another end 60 of the spring 54 has a J-shape configuration and is attached to the valve disc 52 by a rivet 62. The spring 54 has a bend 64 disposed between the ends 56 and 60. The bend 64 has an essentially V-shaped configuration.

An actuating member, such as a screw or other suitable means, 66 has a head portion 68 disposed exteriorly of the housing 18 and its stem portion 70 extending through the housing 18 into the filter cartridge chamber 14. The end portion 72 of the stem portion 70 reactively engages the bend 64 of the spring 54. The screw 66 is movable within the threaded bore 74 of the housing 18 which may also function as a drain opening.

In operation, whenever it is necessary to replace a filter cartridge 24, the fluid, such as oil or any other liquified substance, may be drained right from the filter cartridge chamber 14 after removal of the cover 30 and filter plug 28 or through the filter plug circulation openings 34 if only the filter plug cover 30 is removed. In order to prevent the fluid loss from the main hydraulic fluid reservoir 16 during the filter service, the check valve assembly 10 is actuated by the screw 66 to block the fluid flow from the reservoir 16 to chamber 14. The actuating screw 66 is movable through the housing 18. By turning the screw 66 counterclockwise the screw end portion 72, which is lockably engaged with the bend 64 of the spring 54, releases the spring 54 out of their engagement. Thus, the valve disc 52 urged by the spring 54 may now close the central bore 50 of collar 44, thereby blocking the fluid flow from the fluid reservoir 16 to the filter cartridge chamber 14. Following the closure of the inlet opening or bore 50, a filter cover 30 and a filter plug 28 can be removed and the chamber fluid drained. Thereafter, the filter cartridge can be replaced or serviced.

Conversely, after replacing or servicing the filter 24, the filter plug 28 and plug cover 30 can be placed back in place. The actuating screw 66, if turned clockwise, would move inwardly toward the chamber 14. Upon contact of the screw end portion 72 with the bend 64 the increased tension in the spring 54 would urge it to lift a valve disc 52, attached to the spring end 60, to its open position. In the process of force application to the spring 54 the valve disc 52 can be placed in a plurality of fixed positions between its completely closed and open positions. Thus, the free flow of the fluid from the main reservoir to the filter chamber will be resumed.

This assembly and system can be utilized in a different manner. Although the removal of the filter cartridge 24 from the filter chamber 14 will be accomplished substantially in the above discussed fashion, the actuating screw 66 can now be also used as a drain plug element for the fluid in the filter cartridge chamber 14. The withdrawal of the actuating screw 66 out of a lockable engagement with the spring 54 by turning it counterclockwise will release tension on the spring 54, thereby permitting it to move the valve disc 52 to the inlet closing position and at the same time drain the filter chamber fluid through the opening 74. Conversely, plugging the drain opening 74, by turning clockwise the actuating screw 66, would initiate the inward movement of the screw end portion 72 toward the filter cartridge chamber 14 and lockable engagement with the spring bend 64. This would lift the valve disc 52 and permit the fluid to move from the reservoir 16 to the filter cartridge chamber 14. In this variant the screw performs a double function of the drain plug and actuating member for the system.

As discussed above, an actuating screw can be used, in one variant, as a means for regulating tension in a spring which in turn moves a valve disc between a check valve closed and open position. This spring tension adjustment can be made exteriorly of a filter system housing which encloses a fluid reservoir, filter cartridge chamber and check valve assembly controlling the fluid flow therebetween. In this variant closing and opening of the check valve is accomplished without the draining of the fluid from either the reservoir or filter cartridge chamber. Thus the chamber fluid drain for servicing of a filter cartridge in the chamber occurs after the check valve is closed and fluid flow is blocked.

In another variant, an actuating screw performs a function of a drain plug for the filter cartridge chamber drain opening. Therefore, withdrawal of the actuating screw would cause a simultaneous closing of the check valve and chamber fluid drain through the drain opening. Conversely, plugging the drain opening by the actuating screw would automatically open the check valve thereby permitting the free flow of fluid from the reservoir to the chamber.

The foregoing description and drawings merely express and illustrate the invention and the invention is not limited thereto except insofar as the appended claims are so limited, as those skilled in the art who have the disclosure before them will be able to make modifications and variations therein without departing from the scope of the invention.

What is claimed is:

1. In a hydraulic filter system housing with a fluid reservoir, a removable filter cartridge chamber and a check valve assembly disposed therebetween and comprising:

a chamber enclosure wall rigidly attached to the housing and separating said filter chamber from said fluid reservoir;

said enclosure wall having an inlet opening;

a valve seat extending about said opening and removably attached to said enclosure wall;

said valve seat having a central bore serving as a fluid flow conduit between said reservoir and said chamber;

a valve element movable between bore open and closed positions and engageable with said valve seat in the bore closed position, thereby regulating the volume of the fluid flow moving from said reservoir to said chamber;

biasing means removably attached to said housing at one end and connected with said valve element at another for urging said valve element to engage with said valve seat;

tension adjusting means mounted on said housing and movable therethrough for regulating tension in and actuating said biasing means thereby causing the associated valve element to move between said open and closed positions without compromising the housing leak integrity; and said tension adjusting means being able to place said valve element in a plurality of spatially fixed positions via said biasing means.

2. The valve assembly according to claim 1, wherein:

said tension adjusting means comprises a screw having head and stem portions;

said head portion disposed exteriorly of said housing; and said stem portion being movable through said housing and reactively engageable with said biasing means.

3. The check valve assembly according to claim 1, and said biasing means disposed in said filter cartridge chamber.

4. The check valve assembly according to claim 1, and said biasing means comprising a leaf spring with its free end being rigidly attached to said valve element, and said leaf spring having a bend portion being engageable with said tension adjusting means.

5. The check valve assembly according to claim 1, and said valve element comprising a dish-shaped disc.

6. The check valve assembly according to claim 1, and said valve seat including:
 a collar of a frusto-conical configuration with a central bore;
 said collar having a base portion facing said filter cartridge chamber; and
 said collar having a recess peripherally extending thereabout and adapted to fit an edge of the enclosure wall defining said inlet opening.

7. The check valve assembly according to claim 1, and said tension adjusting means being controllable and actuated exteriorly of said housing.

8. A check valve assembly disposed between a fluid reservoir and a removable filter cartridge chamber in a hydraulic filter system housing and comprising:
 a chamber enclosure wall rigidly attached to the housing and separating said main fluid reservoir and said filter chamber;
 said enclosure wall having an inlet opening, said valve seat having a central bore serving as a fluid flow conduit between said reservoir and said chamber;
 a valve element movable between conduit open and closed positions and engageable with said valve seat in the closed position, thereby regulating the fluid flow moving from said reservoir to said chamber through said conduit;
 leaf spring means removably attached to said housing at one end and connected with said valve element at another for urging said valve element to engage with said valve seat;
 said housing having a drain opening for draining of the filter cartridge chamber fluid;
 fluid drain plug means movable through said drain opening and reactively engageable with said leaf spring means thereby causing the valve element to gradually move between said conduit open and closed positions;
 whereby upon removal of said drain plug means from said housing, said check valve assembly will be closed by virtue of said valve element blocking the flow through said conduit and said filter cartridge chamber fluid will be drained through said drain opening.

9. The check valve assembly according to claim 8, and said drain plug means mounted in a lower portion of said filter cartridge chamber and below an associated filter cartridge.

10. The check valve assembly according to claim 8, and said leaf spring means comprising a leaf spring with one end being rigidly attached to said housing within said chamber and another free end secured to said movable valve element,
 said leaf spring having a bend between its ends, and said drain plug means reactively engageable with said bend.

11. The check valve assembly according to claim 8, and said drain plug means comprising a valve actuating screw movable through said housing.

12. The check valve assembly according to claim 10, and said free end having a J-shape configuration.

13. The check valve assembly according to claim 8, and said valve element comprising a dish-shaped disc;
 said valve seat including a collar of a frustoconical configuration having said central bore;
 said collar having a base portion facing said chamber; and
 said disc being engageable with said base portion for blocking the fluid flow through said bore.

14. The check valve assembly according to claim 10, and said bend having a V-shaped configuration.

* * * * *